(12) United States Patent
Jiang et al.

(10) Patent No.: US 10,664,013 B2
(45) Date of Patent: May 26, 2020

(54) FLEXIBLE DISPLAY MODULE AND ELECTRONIC APPARATUS COMPRISING THE FLEXIBLE DISPLAY MODULE

(71) Applicant: Wuhan China Star Optoelectronics Technology Co., Ltd., Wuhan (CN)

(72) Inventors: Guodong Jiang, Wuhan (CN); Shuru Lin, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/519,372

(22) PCT Filed: Feb. 27, 2017

(86) PCT No.: PCT/CN2017/074969
§ 371 (c)(1),
(2) Date: Apr. 14, 2017

(87) PCT Pub. No.: WO2018/141120
PCT Pub. Date: Aug. 9, 2018

(65) Prior Publication Data
US 2019/0086960 A1    Mar. 21, 2019

(30) Foreign Application Priority Data

Feb. 6, 2017 (CN) .......................... 2017 1 0065571

(51) Int. Cl.
*G06F 1/16* (2006.01)
(52) U.S. Cl.
CPC .......... *G06F 1/1641* (2013.01); *G06F 1/1618* (2013.01); *G06F 1/1652* (2013.01); *G06F 1/1681* (2013.01)

(58) Field of Classification Search
CPC .... G06F 1/1641; G06F 1/1652; G06F 1/1681; G06F 1/1618
See application file for complete search history.

(56) References Cited

U.S. PATENT DOCUMENTS 6,256,017 B1 * 7/2001 Bullister ............... G06F 1/1616
345/168
6,305,050 B1 * 10/2001 Imai ..................... G06F 1/1616
16/303

(Continued)

FOREIGN PATENT DOCUMENTS

CN    102701823 A    10/2012

*Primary Examiner* — Daniel P Wicklund
*Assistant Examiner* — Douglas R Burtner

(57) ABSTRACT

A flexible display module and an electronic apparatus comprising the flexible display module are disclosed. The flexible display module comprises a first supporter, a second supporter, a third supporter, a connector, and a flexible screen. The first supporter, the connector, the second supporter, and the third supporter are connected rotatably with one another in sequence. The first supporter, the second supporter, and the third supporter are used for supporting the flexible screen together. According to the present disclosure, not only large size display can be provided, but also part of contents can be displayed after the flexible screen is completely folded. The flexible screen can be completely folded after inward folding once and outward folding once. In this manner, part of the flexible screen can be hidden inside the display device, and the other part of the flexible screen can be exposed outside the display device. The flexible screen has a good portability and a long lifetime.

6 Claims, 5 Drawing Sheets

(56) References Cited

U.S. PATENT DOCUMENTS

| | | | |
|---|---|---|---|
| 8,738,101 B1* | 5/2014 | Myr | H04M 1/0214 |
| | | | 379/330 |
| 8,837,126 B2 | 9/2014 | Cho et al. | |
| 9,179,559 B1* | 11/2015 | Kim | G06F 1/1616 |
| 2005/0164752 A1* | 7/2005 | Lau | G06F 1/1616 |
| | | | 455/575.3 |
| 2009/0007379 A1* | 1/2009 | Zhang | E05D 11/1042 |
| | | | 16/295 |
| 2011/0216064 A1* | 9/2011 | Dahl | G06F 1/1616 |
| | | | 345/428 |
| 2012/0139815 A1* | 6/2012 | Aono | G06F 1/1616 |
| | | | 345/1.3 |
| 2013/0120912 A1* | 5/2013 | Ladouceur | H04M 1/0268 |
| | | | 361/679.01 |
| 2013/0222998 A1 | 8/2013 | Cho et al. | |
| 2014/0213325 A1* | 7/2014 | Kawasaki | H04M 1/0216 |
| | | | 455/566 |
| 2014/0285992 A1* | 9/2014 | Yang | G02F 1/133305 |
| | | | 361/809 |
| 2015/0116917 A1* | 4/2015 | Aono | G06F 1/1681 |
| | | | 361/679.04 |
| 2015/0248149 A1* | 9/2015 | Yamazaki | G06F 1/1652 |
| | | | 361/679.27 |
| 2016/0274676 A1* | 9/2016 | Jung | G06F 3/04883 |
| 2016/0357489 A1* | 12/2016 | Dong | G06F 3/1423 |
| 2017/0082889 A1 | 3/2017 | An et al. | |
| 2017/0254127 A1* | 9/2017 | Uchiyama | E05D 3/14 |
| 2018/0007182 A1 | 1/2018 | Lin | |
| 2018/0067520 A1* | 3/2018 | Maatta | G06F 1/1618 |
| 2019/0179373 A1* | 6/2019 | Cheng | F16C 11/12 |

* cited by examiner

FLEXIBLE DISPLAY MODULE AND ELECTRONIC APPARATUS COMPRISING THE FLEXIBLE DISPLAY MODULE

CROSS REFERENCE TO RELATED APPLICATION

The present application claims priority of Chinese patent application CN201710065571.7, entitled "Flexible Display Module and Electronic Apparatus Comprising the Flexible Display Module" and filed on Feb. 6, 2017, the entirety of which is incorporated herein by reference.

FIELD OF THE INVENTION

The present disclosure relates to the technical field of flexible display device, and particularly to a flexible display module and an electronic apparatus comprising the flexible display module.

BACKGROUND OF THE INVENTION

With the popularity of display terminals, there is an increasingly high requirement for display devices. On the one hand, it is required that the display device has a compact structure and a good portability. On the other hand, it is required that the display device can have a larger display size when providing an entertainment service. However, the two requirements are mutual restraint. If a display device has a good portability, a screen size thereof should be reduced inevitably, and an entertainment experience of a user would be suffered. If a display device has a larger display screen, the size thereof should be increased inevitably, and the portability thereof would be suffered. The appearance of flexible screen provides possibility for solving the aforesaid technical problem. Since the flexible screen does not have rigidity, a certain mechanical structure is needed to support and guide the bending of the flexible screen. With respect to most flexible display devices, the whole screen can be hidden in the display device after folding once. When daily events need to be dealt with, such as watching weather report or time, answering the phone, the display device should be unfolded and then folded again. The unnecessary bending of the flexible screen is increased, and a lifetime thereof would be shortened. Due to the requirement of portability, the screen size of the display device with once-folding function is limited. With respect to a display device which can be folded for several times, a total thickness thereof would be increased, and the portability thereof would be suffered accordingly. Therefore, a display device which has a good portability, a long lifetime, and a large size display screen is needed.

SUMMARY OF THE INVENTION

The present disclosure aims to provide a flexible display module and an electronic apparatus comprising the flexible display module, whereby not only large size display can be provided, but also part of contents can be displayed after the flexible screen is completely folded. The flexible screen can be completely folded after inward folding once and outward folding once. In this manner, part of the flexible screen can be hidden inside the display device, and the other part of the flexible screen can be exposed outside the display device. The flexible screen has a good portability and a long lifetime.

In order to achieve the above purpose, the present disclosure provides a flexible display module, which comprises a first supporter, a second supporter, a third supporter, a connector, and a flexible screen. The first supporter, the connector, the second supporter, and the third supporter are connected rotatably with one another in sequence. The first supporter, the second supporter, and the third supporter are used for supporting the flexible screen together.

One end of the first supporter which is connected with the connector is provided with a curved groove surface, the first supporter comprises two sidewalls which extend from two ends of the curved groove surface, the two sidewalls each are provided with a curved slideway, and the slideway and the curved groove surface have a same bending direction. An edge of the connector has a curved surface for matching the curved groove surface of the first supporter, two sides of the connector are provided with two sliding blocks respectively, and a sliding block near to the first supporter is configured to move in the slideway of the first supporter. One end of the second supporter which is connected with the connector is provided with a curved groove surface, the second supporter comprises two sidewalls which extend from two ends of the curved groove surface, the two sidewalls each are provided with a curved slideway, and the slideway and the curved groove surface have a same bending direction. An edge of the connector has a curved surface for matching the curved groove surface of the second supporter, two sides of the connector are provided with two sliding blocks respectively, and a sliding block near to the second supporter is configured to move in the slideway of the second supporter.

An upper surface of the sidewall near to the first supporter is provided with bar-shaped protrusions, and the connector is provided with a ladder-shaped structure at an upper part of the curved surface correspondingly. An upper surface of the sidewall near to the second supporter is provided with bar-shaped protrusions, and the connector is provided with a ladder-shaped structure at an upper part of the curved surface correspondingly.

Two ends of the connector are provided with two rectangular grooves respectively. An inner surface of each sidewall extending from the first supporter is provided with a rectangular groove, and an inner surface of each sidewall extending from the second supporter is also provided with a rectangular groove. A hinge means is arranged in each of the rectangular grooves of the connector and a corresponding rectangular groove of the first supporter/the second supporter.

The hinge means comprises a male axle, a female axle, a spring, a retaining ring, a cylinder part, and a connection part. The connection part comprises a first portion and a second portion. The male axle comprises a male rectangular part corresponding to the rectangular groove of the first supporter/the second supporter, and the cylinder part and the first portion of the connection part are fixed on the male rectangular part. The female axle comprises a female rectangular part corresponding to the rectangular groove of the connector, and the second portion of the connection part is fixed on the female rectangular part and corresponds to the first portion of the connection part. The female axle is provided with a via hole, whereby the cylinder part runs through. A protrusion is arranged in the via hole of the female axle, and the retaining ring is arranged at a free end of the cylinder part. The cylinder part is sleeved with the spring, and the spring is confined by the protrusion and the retaining ring.

The first portion of the connection part and the second portion of the connection part both are provided with sawteeth at a joint therebetween.

The sawteeth are arranged with an equal distance thereamong.

The third supporter is hinged to the second supporter through a shaft.

Two grooves are arranged directly opposite to each other at a radial edge of a hinge part of the third supporter. A cylindrical groove is arranged at a part of the second supporter which contacts the hinge part of the third supporter, and the cylindrical groove is provided with a spring and a steel ball therein. When the third supporter rotates to a position where the third supporter is in a same horizontal plane as the second supporter, the steel ball is partly squeezed into one groove by the spring in the cylindrical groove. When the third supporter rotates to a position where the third supporter fits with the second supporter, the steel ball is partly squeezed into the other groove by the spring in the cylindrical groove.

The present disclosure further provides an electronic apparatus, which comprises the aforesaid flexible display module.

The following beneficial effects can be brought about according to the present disclosure.

1. Part of the flexible screen can be hidden inside the display device, and the other part of the flexible screen can be exposed outside the display device after inward folding once and outward folding once. Compared with other display devices in which the flexible screen is hidden after being folded, the flexible display module disclosed herein can provide some display functions in a completely folded state, such as time, date, weather report, call remind, memorandum, and so on. The flexible display module does not need to be unfolded when a user only wants to see time, date, weather report, make or answer a call. The unnecessary bending of the flexible screen can be reduced, and thus a lifetime thereof can be prolonged.

2. The flexible display module disclosed herein can provide a larger display size compared with the display device which can be folded once, and has a smaller total thickness compared with the display device which can be folded for several times.

BRIEF DESCRIPTION OF THE DRAWINGS

The present disclosure will be illustrated in detail hereinafter with reference to the embodiments and the accompanying drawings. In the drawings.

Figure 1:
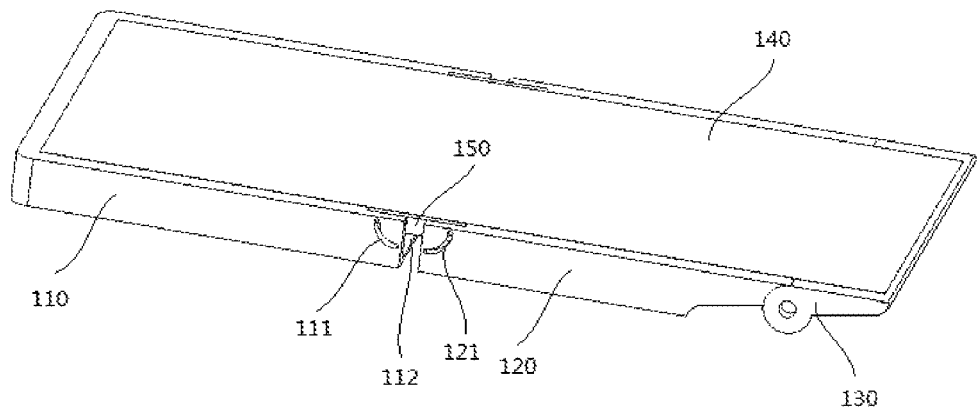
FIG. 1 is a three dimensional diagram of a flexible display module according to the present disclosure in a completely unfolded state.

In the drawings, the same components are represented by the same reference signs, and the size of each component does not represent the actual size of the corresponding component.

DETAILED DESCRIPTION OF THE EMBODIMENTS

The present disclosure will be illustrated further with reference to the drawings.

As shown in FIG. 1, the present disclosure provides a flexible display module, which comprises a first supporter 110, a second supporter 120, a third supporter 130, a connector 150, a hinge means 170, and a flexible screen 140.

Figure 2:
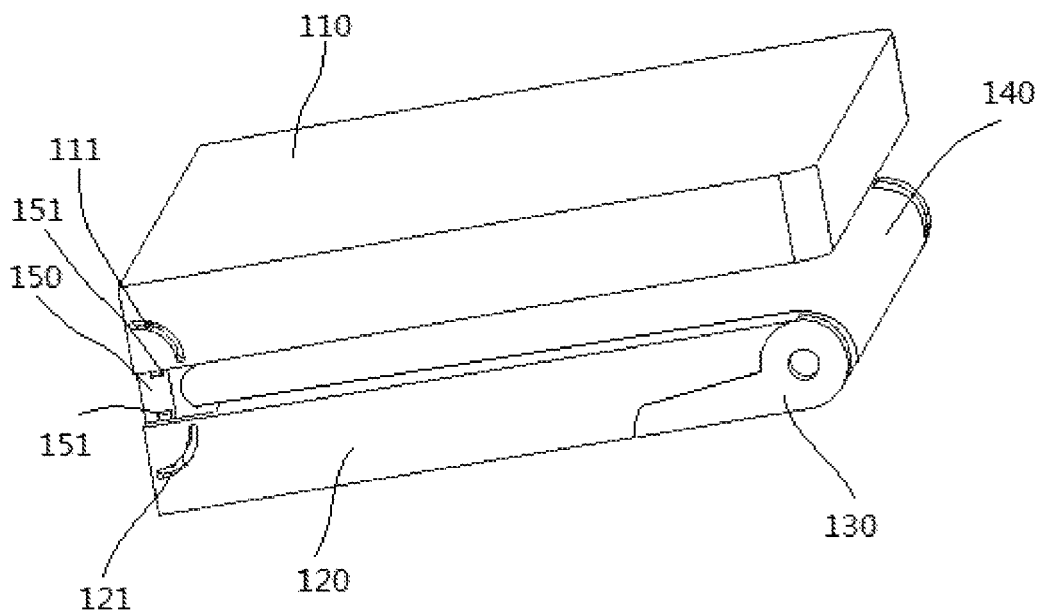
FIG. 2 is a three dimensional diagram of a flexible display module according to the present disclosure in a folded state.

The first supporter 110, the connector 150, the second supporter 120, and the third supporter 130 are connected rotatably with one another in sequence, and the first supporter 110, the second supporter 120, and the third supporter 130 are used for supporting the flexible screen 140 together. When the first supporter 110, the second supporter 120, and the third supporter 130 are in a same horizontal plane, the flexible screen 140 is in an unfolded state. At this time, the flexible screen 140 has a largest display size. When the first supporter 110 rotates to a position coinciding with the second supporter 120 and the third supporter 130 rotates to a position fitting with the second supporter 120, the flexible screen 140 is in a folded state and can be carried conveniently, as shown in FIG. 2.

Figure 3:
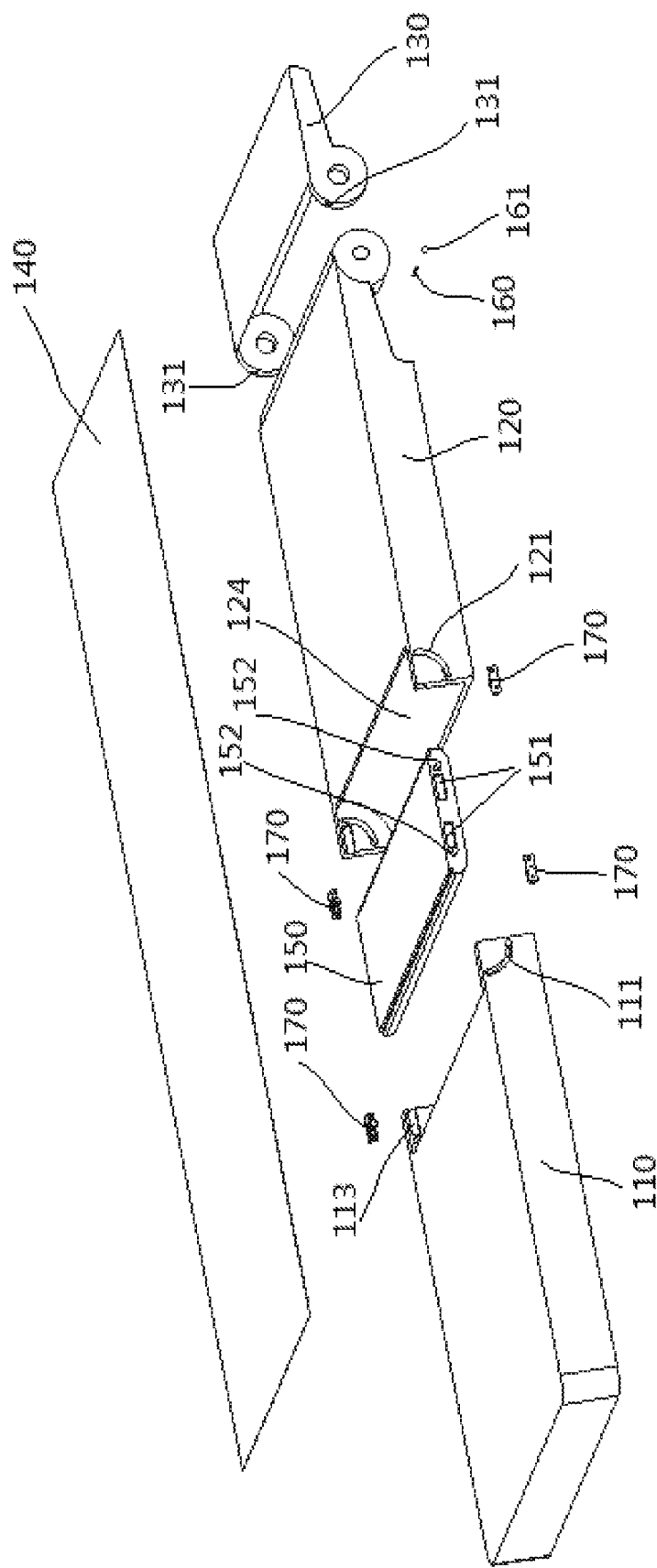
FIG. 3 schematically shows a flexible display module according to the present disclosure in a detached state.

As shown in FIG. 3, the first supporter 110 is connected with the second supporter 120 through the connector 150. A connection structure between the first supporter 110 and the connector 150 is similar to that between the second supporter 120 and the connector 150, and the connection structure will be illustrated below taking the second supporter 120 as shown in FIG. 4 as an example.

One end of the second supporter 120 which is connected with the connector 150 is provided with a curved groove surface 124. In addition, the second supporter 120 comprises two sidewalls which extend from two ends of the curved groove surface 124, and the two sidewalls each are provided with a curved slideway 121. The slideway 121 and the curved groove surface 124 have a same bending direction. Moreover, an upper surface of the sidewall near to the second supporter 120 is provided with bar-shaped protrusions (not shown in FIG. 4).

Figure 5:
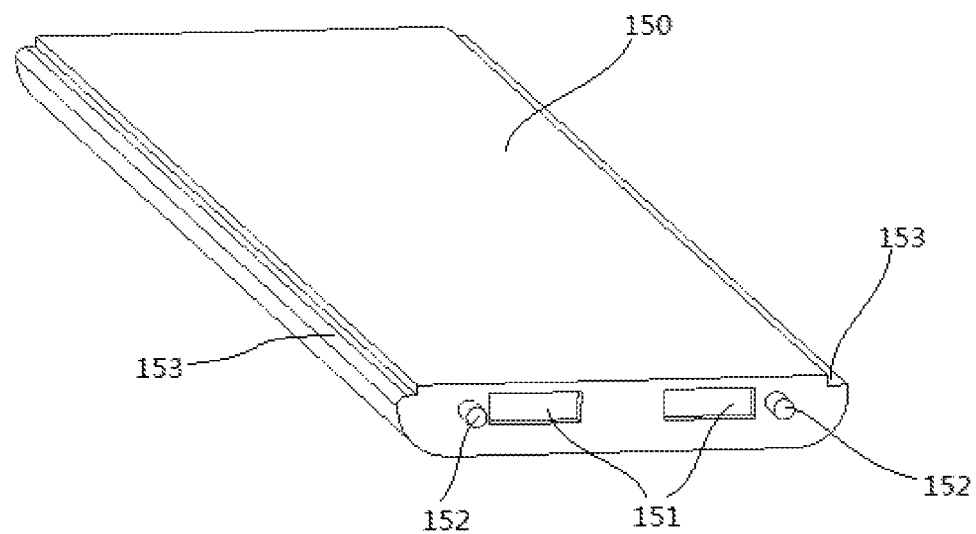
FIG. 5 is a three dimensional diagram of a connector.

Correspondingly, as shown in FIG. 5, an edge of the connector 150 has a curved surface (not shown in FIG. 5) for matching the curved groove surface 124 of the second supporter 120, so that the curved surface of the connector 150 can move along the curved groove surface 124. Moreover, two sides of the connector 150 are provided with two sliding blocks 152 respectively, so that a sliding block 152 near to the second supporter 120 can move in the slideway 121 of the second supporter 120, and a sliding block 152 near to the first supporter 110 can move in the slideway 111 of the first supporter 110. Furthermore, the connector 150 is provided with a ladder-shaped structure 153 at an upper part of the curved surface, so that the ladder-shaped structure 153, together with the bar-shaped protrusions of the first supporter 110 or the bar-shaped protrusions of the second supporter 120, can play a role of fixation. That is, when the connector 150 rotates to a position where the connector 150 is in a same horizontal plane with the first supporter 110, the ladder-shaped structure 153 of the connector 150 near to the first supporter 110 fits with the bar-shaped protrusions of the first supporter 110, so that the connector 150 can be prevented from further rotating relative to the first supporter 110; and when the connector 150 rotates to a position where the connector 150 is in a same horizontal plane with the second supporter 120, the ladder-shaped structure 153 of the connector 150 near to the second supporter 120 fits with the bar-shaped protrusions of the second supporter 120, so that the connector 150 can be prevented from further rotating relative to the second supporter 120.

Figure 4:
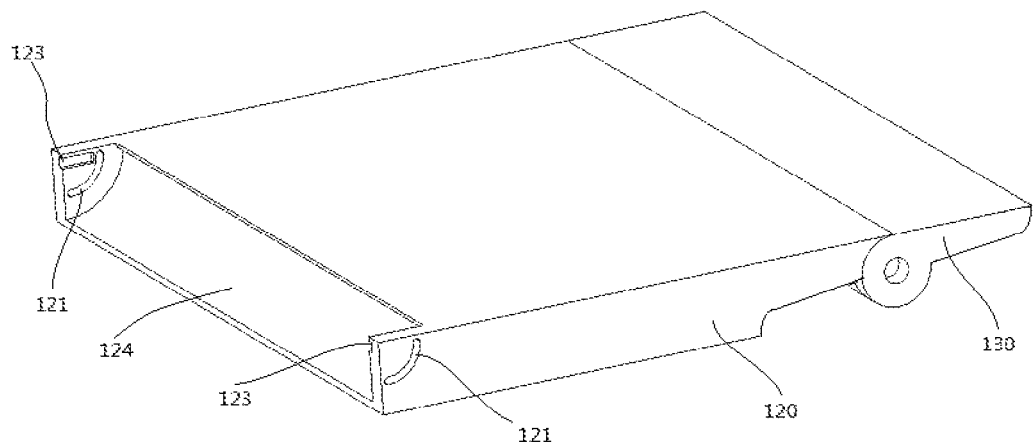
FIG. 4 is a three dimensional diagram of a second supporter.
Figure 6:
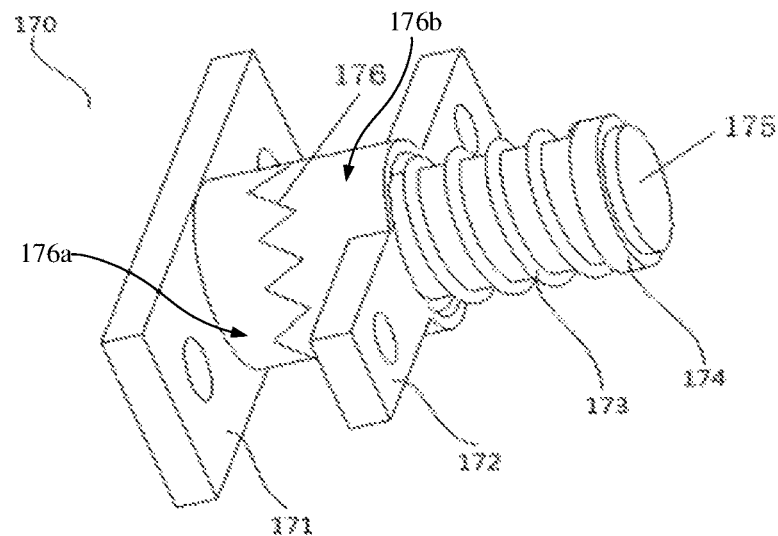
FIG. 6 is a three dimensional diagram of a hinge means.

Combining FIGS. 4 to 6, two ends of the connector 150 are provided with two rectangular grooves 151 respectively. Correspondingly, an inner surface of each sidewall extending from the first supporter 110 is provided with a rectangular groove 113, and an inner surface of each sidewall extending from the second supporter 120 is also provided with a rectangular groove 123. A hinge means 170 is arranged in each of the rectangular grooves of the connector 150 and a corresponding rectangular groove of the first supporter 110/the second supporter 120.

As shown in FIG. 6, the hinge means 170 comprises a male axle 171, a female axle 172, a spring 173, a retaining ring 174, a cylinder part 175, and a connection part 176. The connection part comprises a first portion 176a and a second portion 176b. The male axle 171 comprises a male rectangular part corresponding to the rectangular groove 113/123 of the first supporter 110/the second supporter 120, and the cylinder part 175 and the first portion 176a of the connection part 176 are fixed on the male rectangular part. The first portion 176a of the connection part 176 has a roughly cylinder shape, and one side of the first portion 176a of the connection part 176 far from the male rectangular part is provided with sawteeth. The female axle 172 comprises a female rectangular part corresponding to the rectangular groove 151 of the connector 150, and the second portion 176b of the connection part 176 is fixed on the female rectangular part. The female axle 172 is provided with a via hole, whereby the cylinder part 175 runs through. A protrusion (not shown in FIG. 6) is arranged in the via hole of the female axle 172, and the retaining ring 174 is arranged at a free end of the cylinder part 175. The cylinder part 175 is sleeved with the spring 173, and the spring 173 is confined by the protrusion and the retaining ring 174. The spring 173 is compressed in normal state, and thus the male axle 171 and the female axle 172 are always compressed against each other.

The sawteeth of the connection part 176 are arranged with an equal distance thereamong, and the distance between each two adjacent sawteeth can be arranged according to actual needs. For example, the distance between each two adjacent sawteeth can be arranged as 1/12 of a circumference of the connection part 176. In this manner, the male axle 171 and the female axle 172 can almost be fixed with each other at any angle. Of course, a shape of the connection part 176 is not necessarily the sawteeth as shown in FIG. 6. The connection part 176 can have a wave shape, or the connection part 176 can be provided with grooves and corresponding protrusions at a certain angle. For example, the connection part 176 can be provided with grooves and corresponding protrusions for each 90°.

The male rectangular part of the male axle 171 is arranged in the rectangular groove 113/123 of the first supporter 110/the second supporter 120 in a fixed manner, and the female rectangular part of the female axle 172 is fixed in the rectangular groove 151 of the connector 150. When the flexible screen is unfolded, the first supporter 110/the second supporter 120 and the connector 150 are all in a same horizontal plane, and thus the male rectangular part of the male axle 171 is parallel to the female rectangular part of the female axle 172. When the flexible screen needs to be folded, the first supporter 110/the second supporter 120 forms a certain angle with the connector 150, and the male axle 171 and the female axle 172 can be fixed with each other at a corresponding angle through the connection part 176. Therefore, the flexible screen can be fixed at a certain angle.

Figure 7:
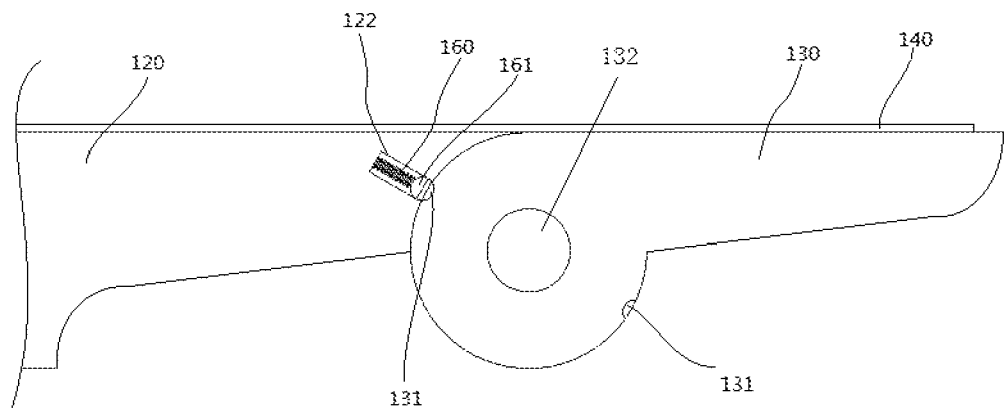
FIG. 7 is a side view of a third supporter in an unfolded state.
Figure 8:
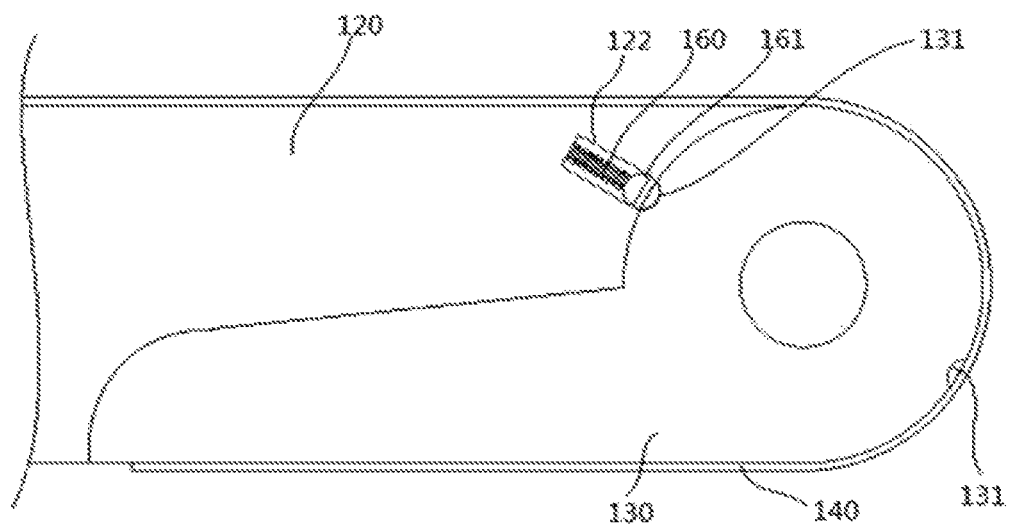
FIG. 8 is a side view of a third supporter in a folded state.

At last, as shown in FIGS. 7 and 8, the third supporter 130 is hinged to the second supporter 120 through a shaft 132. Two grooves 131 are arranged directly opposite to each other at a radial edge of a hinge part of the third supporter 130. Preferably, the grooves 131 are ball-shaped grooves. Correspondingly, a cylindrical groove 122 is arranged at a part of the second supporter 120 which contacts the hinge part of the third supporter 130, and the cylindrical groove 122 is provided with a spring 160 and a steel ball 161 therein. When the third supporter 130 rotates to a position where the third supporter 130 is in a same horizontal plane as the second supporter 120, the steel ball 161 is partly squeezed into one groove 131 by the spring 160 in the cylindrical groove 122. When the third supporter 130 rotates to a position where the third supporter 130 fits with the second supporter 120, the steel ball 161 is partly squeezed into the other groove 131 by the spring 160 in the cylindrical groove 122. When the steel ball 161 is partly squeezed into the groove 131, the steel ball can play the role of fixation, so that a relative relationship between the third supporter 130 and the second supporter 120 can be maintained stable. In this manner, when the flexible screen is completely unfolded, the third supporter 130 will not rotate downwards about a shaft thereof due to gravity.

An operational principle of the present disclosure will be stated below.

When the first supporter 110, the second supporter 120, and the third supporter 130 are in a same horizontal plane, the flexible screen 140 is in an unfolded state. At this time, the flexible screen 140 has a largest display size.

When the first supporter 110 rotates to a position where the first supporter 110 coincides with the second supporter 120 and the third supporter 130 rotates to a position where the third supporter 130 fits with the second supporter 120, the flexible screen 140 is in a completely folded state. At this time, part of the flexible screen 140 is in a gap between the first supporter 110 and the second supporter 120, and the other part of the flexible screen 140 arranged on the third supporter 130 rotates to a plane coinciding with a lower surface of the second supporter 120 through movement with the third supporter 130. Therefore, only the part of flexible screen 140 arranged on the third supporter 130 has a display function, and the display device has the smallest display size, as shown in FIG. 2.

The present disclosure further provides an electronic apparatus which comprises the flexible display module.

The following beneficial effects can be brought about according to the present disclosure.

1. Part of the flexible screen 140 can be hidden inside the display device, and the other part of the flexible screen 140 can be exposed outside the display device after inward folding once and outward folding once. Compared with other display devices in which the flexible screen is hidden after being folded, the flexible display module disclosed herein can provide some display functions in a completely folded state, such as time, date, weather report, call remind, memorandum, and so on. The flexible display module does not need to be unfolded when a user only wants to see time, date, weather report, make or answer a call. The unnecessary bending of the flexible screen 140 can be reduced, and thus a lifetime thereof can be prolonged.

2. The flexible display module disclosed herein can provide a larger display size compared with the display device which can be folded once, and has a smaller total thickness compared with the display device which can be folded for several times.

The present disclosure is illustrated in detail in combination with preferred embodiments hereinabove, but it can be understood that the embodiments disclosed herein can be improved or substituted without departing from the protection scope of the present disclosure. In particular, as long as there are no structural conflicts, the technical features disclosed in each and every embodiment of the present disclosure can be combined with one another in any way, and the combined features formed thereby are within the protection scope of the present disclosure. The present disclosure is not limited by the specific embodiments disclosed herein, but includes all technical solutions falling into the protection scope of the claims.

The invention claimed is:

1. A flexible display module, comprising a first supporter, a second supporter, a third supporter, a connector, and a flexible screen, wherein the first supporter, the connector, the second supporter, and the third supporter are connected rotatably with one another in sequence, and the first supporter, the second supporter, and the third supporter are used for supporting the flexible screen together;

wherein two ends of the connector are provided with two rectangular grooves respectively;

wherein, correspondingly, an inner surface of each sidewall extending from the first supporter is provided with a rectangular groove, and an inner surface of each sidewall extending from the second supporter is also provided with a rectangular groove; and wherein a hinge means is arranged in each of the rectangular grooves of the connector and a corresponding rectangular groove of the first supporter/the second supporter;

wherein the hinge means comprises a male axle, a female axle, a spring, a retaining ring, a cylinder part, and a connection part; the connection part comprises a first portion and a second portion;

wherein the male axle comprises a male rectangular part corresponding to the rectangular groove of the first supporter/the second supporter, and the cylinder part and the first portion of the connection part are fixed on the male rectangular part;

wherein the female axle comprises a female rectangular part corresponding to the rectangular groove of the connector, and the second portion of the connection part is fixed on the female rectangular part and corresponds to the first portion of the connection part;

wherein the female axle is provided with a via hole, whereby the cylinder part runs through;

wherein a protrusion is arranged in the via hole of the female axle, and the retaining ring is arranged at a free end of the cylinder part; and wherein the cylinder part is sleeved with the spring, and the spring is confined by the protrusion and the retaining ring.

2. The flexible display module according to claim 1, wherein the first portion of the connection part and the second portion of the connection part both are provided with sawteeth at a joint therebetween.

3. The flexible display module according to claim 2, wherein the sawteeth are arranged with an equal distance thereamong.

4. The flexible display module according to claim 1, wherein the third supporter is hinged to the second supporter through a shaft.

5. The flexible display module according to claim 2, wherein the third supporter is hinged to the second supporter through a shaft.

6. The flexible display module according to claim 3, wherein the third supporter is hinged to the second supporter through a shaft.

* * * * *